Dec. 9, 1930.   H. W. DIETERT   1,784,420
CONTINUOUS IRON TEMPERATURE RECORDER
Filed July 12, 1926
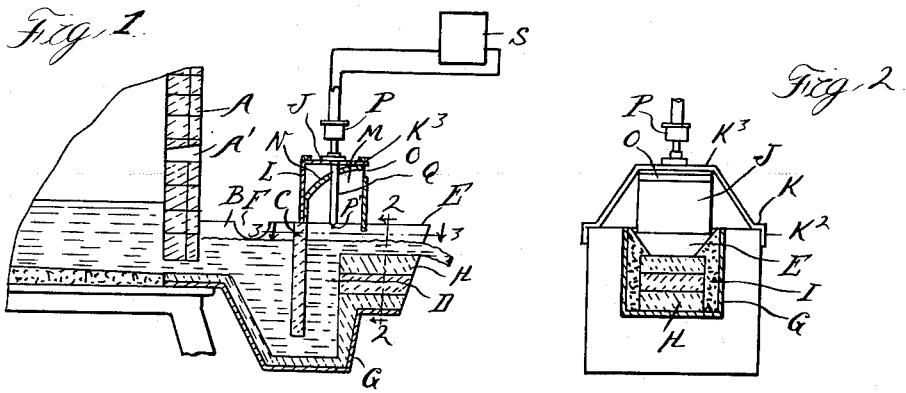
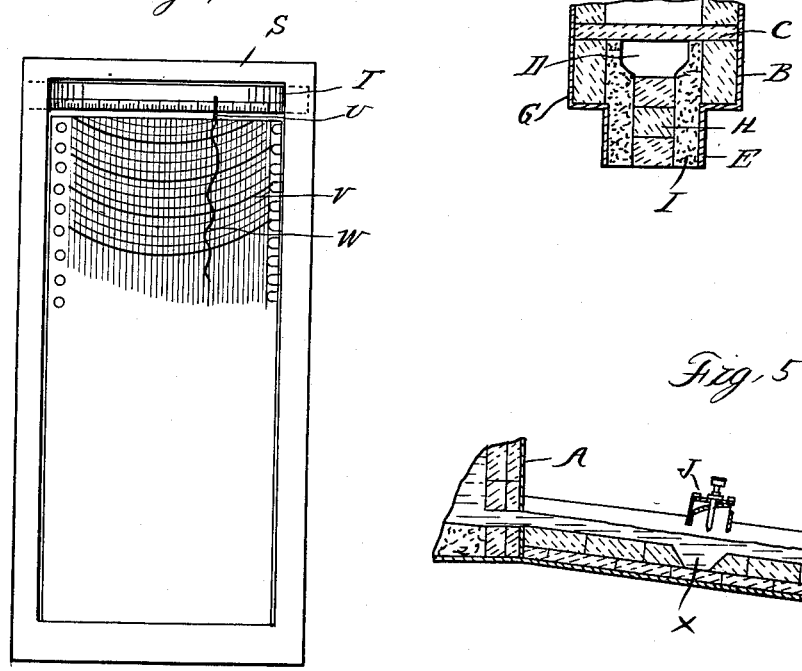
Inventor
Harry W. Dietert
By Whittemore Hulbert Whittemore
& Belknap
Attorneys Patented Dec. 9, 1930

1,784,420

UNITED STATES PATENT OFFICE

HARRY W. DIETERT, OF DETROIT, MICHIGAN, ASSIGNOR TO UNITED STATES RADIATOR COR., OF DETROIT, MICHIGAN, A CORPORATION OF MICHIGAN

CONTINUOUS IRON-TEMPERATURE RECORDER

Application filed July 12, 1926. Serial No. 121,988.

The invention relates to a method of measuring the temperature of molten metals and an apparatus for carrying out said method. The invention is particularly desirable as an aid to securing uniformity of iron pouring temperatures in a melting furnace such as cupolas and the like which operate under forced blast. However, there are other instances where the invention may advantageously be used.

In the present state of the art there is no known method for continuously recording the temperature of molten iron. There are several methods by which the temperature of the molten iron may be determined but none which are applicable for continuously indicating the temperature changes in a continuously operating cupola furnace.

The immersion pyrometer which is a popular method of measuring temperature of non-ferrous metals is not adapted for molten iron since there are no known elements adapted for thermocouple use which will withstand constant immersion in molten iron. The optical pyrometer, the radiation pyrometer and the calorimeter method may all be used for determining the iron temperature at certain intervals but none of these methods will indicate continuously without an operator and none are adaptable for automatic recording.

My improved method of measuring the température of molten metals consists in collecting the gases evolved from the molten metal in a chamber which is so constructed as to prevent outside conditions from affecting the temperature of the same and in measuring the temperature of said gases I have found that there is a definite relationship of the gas temperature to the molten metal temperature so that any increase in the temperature of the metal results in a corresponding change in the temperature of the gas. Thus by properly calibrating the instrument it is possible to correctly measure the temperature of the molten metal by a thermocouple or other temperature responsive element which is arranged in the chamber containing the evolved gases.

In the drawings Figure 1 represents a cross section through the pouring spout of a cupola. Figure 2 is a transverse section on the line 2—2 of Figure 1. Figure 3 is a sectional plan view of the spout. Figure 4 is a recording mechanism adapted for use with this apparatus. Figure 5 is a section through the pouring spout of a slightly modified construction.

Referring now to a particular embodiment of my invention, A represents the cupola provided with tuyères A' and a pouring spout B. This spout has a bridge block C extending transversely thereof forming the upwardly extending channel conduit D and the horizontally extending discharge channel E, the latter being preferably of the form indicated in Figure 2. F indicates a slag spout extending laterally from the discharge spout B in advance of the bridge block. The discharge channel E is composed of casting G of substantially U shaped cross section which is lined with fire brick H and has the inclined side walls formed by fire clay I.

J represents the hood for collecting the gases evolved from the molten metal and it is preferably placed above the vertical conduit D so as to extend forwardly from the bridge block C. In the particular construction shown the hood J comprises a pair of brackets having flat portions K for resting on the casting G, depending flanges $K^2$ for engaging the side walls thereof and an upwardly extending connecting U shaped portion $K^3$. Depending from the brackets K are the walls L which together form a chamber M open at the bottom and substantially closed on all sides. N is a curved top member which extends from the bridge block C upwardly and forwardly to the forward end of the chamber M thus directing the gases toward the escape outlet O which is arranged in the upper portion of the chamber M.

The thermocouple P extends downwardly through the hood J and has the lower end P' arranged at a predetermined distance from the level of the molten metal in the pouring spout. Preferably the thermocouple is provided with a protecting tube Q surrounding all but the end portion of the thermocouple. The thermocouple P may be provided with the usual compensating leads which in turn are connected to a suitable indicating or recording apparatus S of any of the well known types.

In the operation of the apparatus as thus far described the molten metal rises upwardly through the conduit D and then flows horizontally through the discharge channel E maintaining a substantially constant level. The gases evolved from the iron in its upward movement through the conduit D are collected in chamber M and escape through the outlet O. The temperature of the gases in the chamber M bears a definite relationship to the temperature of the molten metal and this is maintained by preventing air currents from intermingling with the evolved gases.

With the construction as above described the temperature of the gases in the chamber M and consequently the temperature of the unprotected end of the thermocouple are sufficiently low so that a so called base metal thermocouple may be employed for continuously measuring the temperature.

In Figure 4 I have represented one type of temperature recorder the operating mechanism of which is not shown in detail. This recorder, however, has an indicating scale T and indicating pointer U and is also provided with suitable mechanism for intermittently advancing the record sheet V so that the instrument will record a graph W representing the temperature of the molten metal during the entire operation of the furnaces.

As indicated above it is possible to calibrate the apparatus so that the temperature indicated on the recording instrument is the actual temperature of the iron but for ordinary purposes it is not necessary to so calibrate as the graph on the chart indicates any variation in temperature of the iron so that it is learned from the inspection of the same whether the furnace is operating in the desired manner.

In the foregoing description I have shown the temperature recording apparatus as applied to continuously operating furnaces but in many foundries it is necessary to pour the iron intermittently, the usual practice being to run the iron for about half a minute at intervals of about a minute. Under such conditions it is preferable to employ a slightly modified arrangement in order to prevent undue cooling of the thermocouple during the interval when the iron is not flowing through the spout. In Figure 5 I have indicated the modified arrangement wherein the pouring spout is provided with a recess X in the bottom wall of the same, forming a reservoir located directly below the thermocouple and the enclosing hood.

With this construction the molten metal collects in the reservoir when the iron is being poured and remains trapped therein between the successive pouring operations. The heat given off by the trapped molten metal prevents the temperature of the thermocouple from dropping to as great an extent as it would if the reservoir were eliminated so that during the subsequent tapping of the metal the temperature will more quickly rise to correctly indicate the pouring temperature. Since the interval between the successive runs is not very great the iron in the reservoir will remain in the molten condition but if for any reason the time between the runs were extended to such a point that the iron solidified it would only be necessary to remove the slug in the reservoir prior to the next pouring operation. With the intermittently operated furnace the reservoir is an important feature since without the same the temperature of the thermocouple would quickly drop and would require a considerable time to regain its original temperature thereby rendering the apparatus ineffective for a considerable portion of the operation of the furnace.

As an example of the temperatures which my apparatus normally indicates it may be stated that when the iron passing through the pouring spout is approximately 2500° F. and the end of the thermocouple is spaced two inches above the level of the molten metal the temperature indicated by the thermocouple is approximately 1500° F. If the thermocouple were arranged in this manner without the provision of a reservoir beneath the same the temperature indicated by the same five minutes after the pouring of the metal had ceased would drop to approximately 690° F. With the construction as illustrated in Figure 5 the drop in temperature of the thermocouple one minute after the pouring has ceased would be not over 200° F. and this temperature would be quickly regained during the subsequent run so that the correct temperature would be indicated at all times except for a few seconds after the beginning of the pouring operation.

What I claim as my invention is:

1. An apparatus for indicating the temperature of molten metal delivered from a melting furnace comprising a delivery spout, a housing arranged above said spout forming a chamber for collecting gases issuing from the molten metal, a temperature responsive element within said chamber and spaced a predetermined distance from the molten metal in said spout and means for indicating temperature changes in said temperature responsive means.

2. An apparatus for indicating the temperature of molten metal delivered from a melting furnace comprising a delivery spout, a hood above said spout having an upwardly curved top wall, a vertical end wall extending downwardly in proximity to the molten metal in said spout, said hood having an aperture in the upper portion thereof for the escape of the gas collecting in the said hood, and a thermocouple supported by said hood and extending within the same in proximity to the molten metal.

3. In a furnace for molten metals, the combination with a pouring spout having a slag bridge block forming a discharge conduit extending upwardly and then laterally, of a hood above the upwardly extending portion of said conduit provided with side walls forming a chamber for collecting gases issuing from the molten metal, said hood having an escape aperture in the upper portion thereof, and a temperature responsive element supported by said hook and extending within the same in predetermined spaced relation to the level of the molten metal in said spout.

4. In a furnace for molten metal, the combination with a pouring spout having a slag bridge block forming a discharge conduit extending upwardly and then laterally, of a hood above said pouring spout forming a chamber extending forwardly from said bridge block, said hood having side walls extending into proximity to said pouring spout and having an upwardly and forwardly curved top wall, said hood also having an escape aperture in the upper portion of the same, and a temperature responsive element within said hood in predetermined spaced relation to the level of the molten metal in said spout.

5. In a furnace for molten metal, the combination with a channeled pouring spout, a transverse bridge block extending below the level of the molten metal, a frame supported on said channel spout and extending above the same, a hood supported by said frame having depending side walls forming a chamber open at the bottom, a member within said hood curving upwardly and forwardly from said bridge block, a front wall spaced from the forward end of said member to form an escape aperture and a temperature responsive element within said hood in predetermined spaced relationship to the molten metal in said spout.

6. In an apparatus of the class described the combination with a delivery spout, of a hood above said spout, a temperature responsive element within said hood spaced a predetermined distance from the molten metal, and means for trapping the molten metal directly below said thermocouple for maintaining molten metal adjacent said thermocouple during the interval between successive pouring operations.

7. In an apparatus of the class described the combination of a pouring spout having a depressed portion therein forming a reservoir, a gas collecting chamber arranged adjacent to the flowing metal directly above said reservoir, and a temperature responsive element within said chamber spaced a predetermined distance from the level of the molten metal during the pouring of the same.

8. In an apparatus of the class described, the combination with a delivery spout adapted to discharge molten metal, of a hood above said spout, a temperature responsive element within said hood and spaced a predetermined distance from the molten metal in said spout, and means for constantly maintaining a limited quantity of molten metal adjacent said hood for retarding variations in the temperature within said hood during the interval between successive pouring operations.

In testimony whereof I affix my signature.
HARRY W. DIETERT.